US007115862B2

(12) United States Patent
Nagai et al.

(10) Patent No.: US 7,115,862 B2
(45) Date of Patent: Oct. 3, 2006

(54) MASS SPECTROSCOPE AND METHOD OF CALIBRATING THE SAME

(75) Inventors: Shinji Nagai, Hitachinaka (JP); Hiroyuki Yasuda, Hitachinaka (JP); Tetsuya Nishida, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 11/018,375

(22) Filed: Dec. 22, 2004

(65) Prior Publication Data

US 2005/0139763 A1 Jun. 30, 2005

(30) Foreign Application Priority Data

Dec. 24, 2003 (JP) ............................ 2003-426103

(51) Int. Cl.
*B01D 59/44* (2006.01)
*H01J 49/00* (2006.01)
*G01D 18/00* (2006.01)
*G12B 13/00* (2006.01)

(52) U.S. Cl. .................. 250/292; 250/292; 250/252.1; 250/282

(58) Field of Classification Search ............ 250/252.1, 250/282, 292
See application file for complete search history.

(56) References Cited

U.S. PATENT DOCUMENTS 5,171,991 A * 12/1992 Johnson et al. ............. 250/292
6,717,134 B1 * 4/2004 Bowdler ..................... 250/287
2005/0080578 A1 * 4/2005 Klee ........................... 702/85

FOREIGN PATENT DOCUMENTS

JP 7-14540 1/1995

* cited by examiner

*Primary Examiner*—Jack Berman
*Assistant Examiner*—Jennifer Yantorno
(74) *Attorney, Agent, or Firm*—Dickstein Shapiro LLP

(57) ABSTRACT

An ion resonance condition is corrected accurately in an ion trapping device. Measurements are repeated by alternately applying and not applying a resonance frequency voltage while spectral data is obtained continuously. Data obtained in the absence of the resonance frequency voltage is used as reference data to correct the set data of a resonance condition. As a result, calibration can be made while taking into consideration the variations in the amount of ions that are introduced into the ion trap.

8 Claims, 11 Drawing Sheets

| MEASUREMENT COUNT (N) | MAIN HIGH FREQUENCY VOLTAGE VALUE (V) |
|---|---|
| 1 | 1500 |
| 2 | 1510 |
| 3 | 1520 |
| 4 | 1530 |
| 5 | 1540 |
| 6 | 1550 |
| 7 | 1560 |
| 8 | 1570 |
| 9 | 1580 |
| 10 | 1590 |
| ⋮ | ⋮ |

FIG. 8

| MEASUREMENT COUNT (N) | ASSIT AC VOLTAGE FREQUENCY VALUE (kHz) |
|---|---|
| 1 | 260 |
| 2 | 260.5 |
| 3 | 261 |
| 4 | 261.5 |
| 5 | 262 |
| 6 | 262.5 |
| 7 | 263 |
| 8 | 263.5 |
| 9 | 264 |
| 10 | 264.5 |
| ⋮ | ⋮ |

MASS SPECTROSCOPE AND METHOD OF CALIBRATING THE SAME

BACKGROUND OF THE INVENTION

1. Field of the Invention

The present invention relates to the calibration of a mass spectroscope that uses an ion trap.

2. Description of Related Art

An ion trap mass spectroscope comprises a ring electrode having a hyperboloid of revolution of one sheet on the inner surface, and a pair of end-cap electrodes disposed opposite each other across the ring electrode and having a hyperboloid of revolution of two sheets on the inner surface. The space surrounded by the ring electrode and the end-cap electrodes forms an ion trapping area. When a predetermined high-frequency voltage is applied to the ring electrode and the pair of end-cap electrodes, a three-dimensional quadrupole electric field is formed in the ion trapping area, in which ions that are either internally generated or introduced from the outside can be trapped. The thus trapped ions move around in the space inside the electrodes at a frequency specific to their mass. In the ion trap apparatus, by applying an auxiliary AC voltage with a frequency corresponding to the mass of each ion to the end-cap electrodes while holding the trapped ions, a target ion can be caused to resonate and the amplitude of its motion can be increased, thereby allowing the ion to be discharged from the ion trap.

On the other hand, by applying a wideband noise that does not include the frequency components corresponding to the ion with a specific mass, end-cap electrode ions of other masses can be discharged from the electrodes while leaving the ion of the specific mass behind. Thereafter, if a weak resonance frequency voltage corresponding to the selected ion is applied, the motion energy of the ion can be increased while the selected ion is kept inside the ion trap. Consequently, the ion in the ion trap repeatedly collides with the helium gas or the like introduced in the ion trap, resulting in the dissociation of the ion (CID). This series of operations is referred to as MS/MS. By making a comparison between the original spectrum and the spectrum obtained after ionic dissociation, structural information about an organic compound can be obtained. Thus, MS/MS is a very important analysis technique in a variety of fields including pharmacy, biochemistry, and environment.

JP Patent Publication (Kokai) No. 7-14540 A (1995) (Patent Document 1) discloses an example of the conventional technique.

With regard to the target ion of a specific mass, it is necessary to accurately determine the value of a corresponding resonance frequency under specific conditions.

When a DC voltage U and a high-frequency voltage VcosΩt are applied between the individual electrodes, a three-dimensional quadrupole electric field is formed in the space between those electrodes. The orbital stability of an ion trapped in this electric field is determined by the values a and q (Equations (1) and (2)) given by an internal radius $r_0$ of the ring electrode, DC voltage U applied to the electrodes, amplitude V of the main high-frequency voltage and its angular frequency Ω, and the mass-to-charge ratio m/z of the ion.

$$a = \frac{8eU}{r_0^2\Omega^2} \cdot \frac{z}{m} \tag{1}$$

$$q = \frac{4eU}{r_0^2\Omega^2} \cdot \frac{z}{m} \tag{2}$$

where z is the valence of the ion, m is mass, and e is elementary charge.

In conventional products, the DC voltage U is often not used, so that a=0. As a result, only Equation (2) becomes important. The angular frequency ω of the vibration specific to the ion of a particular mass can be calculated as follows.

$$\omega \approx q\Omega/2\sqrt{2} \tag{3}$$

Thus, if $r_0$ and Ω are fixed values, the vibration frequency of the ion of a specific mass in the ion trap can be uniquely determined by setting the amplitude (voltage) V of the high-frequency voltage at a certain value.

Actually, however, subtle deviations are produced in the actual ion and its resonance frequency from the calculated values due to factors such as subtle variations in the high-frequency voltage applied to the ring electrode and the pressure in the ion trap. Accordingly, the resonance frequency or the value of the main high-frequency voltage must be corrected periodically and for each apparatus. In other words, calibration must be performed, which generally involves the following operations.

At first, a standard sample of which the observed mass is known in advance is prepared, and the sample is introduced into an ion source at a fixed flow rate with use of a sample introducing device such as a liquid feed pump. The sample, which is fed continuously, is ionized in the ion source and introduced into a vacuum system via a sampling unit, before it is introduced into an ion trap via an ion transport unit. After the introduced ion has been trapped, a fixed main high-frequency voltage is applied to the ring electrode and, in this condition, an auxiliary AC voltage of a frequency that in calculation corresponds to the mass of the standard sample ion is applied to the end-cap electrodes, thereby causing the target ion to resonate and to be discharged from the ion trap. If there is any deviation, no resonance would occur at the calculated value setting, and the ion would not be discharged.

Therefore, the frequency of the main high-frequency voltage applied to the ring electrode or that of the auxiliary AC voltage applied to the end-cap electrodes is shifted slightly each time ions are fed to the detector, and a change in ion intensity is detected. When a condition under which resonance occurs is satisfied finally, ions are discharged from the ion trap and the ion intensity of the resultant spectrum decreases, thereby allowing the amount of difference between the calculated value and the actual value to be determined. Based on this result, the auxiliary AC frequency applied to the end-cap electrodes or the main high-frequency voltage applied to the ring electrode is corrected, thus completing the calibration process.

[Patent Document 1] JP Patent Publication (Kokai) No. 7-14540 A (1995)

In the above calibration operation, the condition under which ions actually resonate and are discharged from the ion trap is determined by finely adjusting either the frequency of the auxiliary AC voltage applied to the end-cap electrodes that has a resonance frequency corresponding to the ion in the standard sample to be calibrated, or by finely adjusting the amplitude (voltage) of the main high-frequency voltage applied to the ring electrode. The ion intensity of the observed ion is recorded under varying conditions, until a resonance point is determined at which the lowest ion intensity is obtained. The standard sample is introduced into the ion source at a fixed flow rate during calibration such that a constant amount of ions can be supplied to the ion trap stably.

Actually, however, it is very difficult to keep supplying ions stably into the ion trap due to such troubles as deterioration of the performance of the pump that introduces the sample into the ion source, choked pipe, unstable operation of the ion source itself, and decrease in the efficiency of ionization caused by the contamination of the ion source, for example. In many cases, the ion intensity tends to change periodically or decrease with time.

It is therefore an object of the invention to provide a mass spectroscope capable of accurately and highly reliably determining the ion resonance condition, and a method of calibrating the spectroscope.

SUMMARY OF THE INVENTION

The present invention is characterized in that, during the process of acquiring spectrum data continuously, measurements are made while alternately applying and not applying a resonance frequency voltage. Data obtained in the absence of application of the resonance frequency voltage is used as reference data to correct a resonance condition setting data.

According to the present invention, each time ions are introduced into the ion trap, data corresponding to the total amount of ions introduced to the ion trap is measured and is then used as a reference for correction purposes. It is thus possible to find such a set condition under which ions can be discharged from the ion trap with highest efficiency by taking into consideration the ion intensity changes (fluctuation) due to such factors as problems in the pump, the ion source, etc. In other words, the condition under which ions are actually resonant is observed more accurately to realize highly reliable calibration.

BRIEF DESCRIPTION OF THE DRAWINGS

FIG. 8 is another example of resonance condition setting data.

DETAILED DESCRIPTION OF THE PREFERRED EMBODIMENTS

Hereunder, the preferred embodiments of the present invention will be described with reference to the accompanying drawings.

Figure 1:
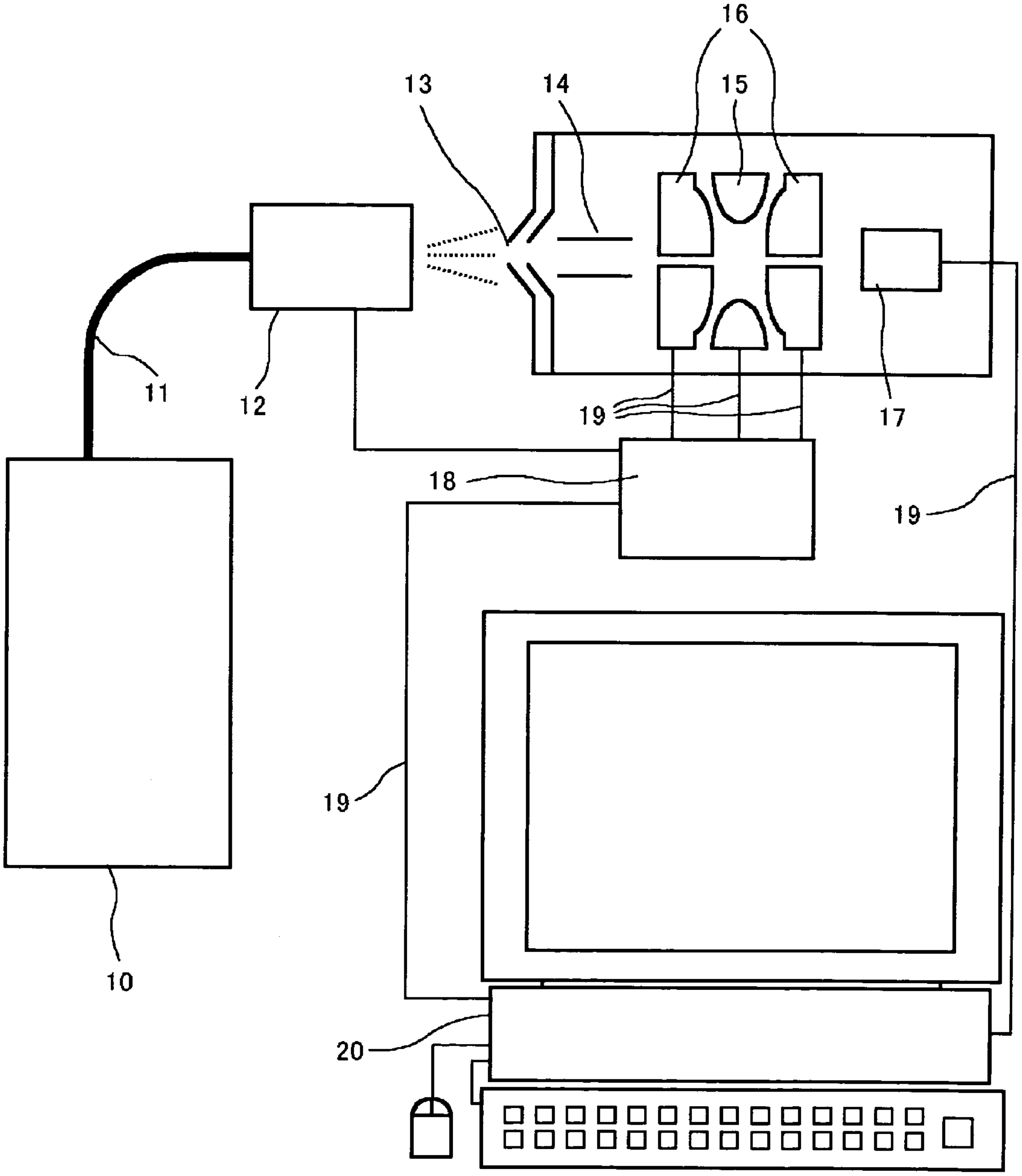
FIG. 1 is a schematic block diagram of the first embodiment.

FIG. 1 is a block diagram of a mass spectroscope used in a first embodiment of the present invention.

The mass spectroscope in this first embodiment, as shown in FIG. 1, comprises a sample introducing device 10 for introducing a standard sample continuously, an ion source 12 for ionizing a dissociated sample, a sampling unit 13 for introducing ions sprayed from the ion source 12 into a vacuum system, an ion transport unit 14 for guiding the introduced ions to an ion trap, a ring electrode 15 and end-cap electrodes 16 constituting an ion trap for holding, selecting, and dissociating introduced ions, and a detector 17 for detecting ions. A pipe 11 is used for the connection between the sample introducing device 10 and the ion source 12.

The mass spectroscope in this embodiment further includes a control unit 18 and a data processing unit 20. Signal lines 19 are used for connections between the ring electrode 15 and end-cap electrodes 16 of the ion trap, the ion source 12, and the control unit 18; between the detector 17 for detecting an ion intensity for each mass and the data processing unit 20; and between the control unit 18 and the data processing unit 20.

The data processing unit 20 sends an ion trap control condition to the control unit 18 according to an input from the user. The data processing unit 20 is capable of controlling the ion trap at high speed of the μsec (microsecond) order. The data processing unit 20 receives, through the signal line 19, mass spectrum data detected by the detector 17 as a result of controlling the ion trap, and then processes the data before recording or displaying it.

The mass spectroscope in this embodiment uses an ion trap having a mass analyzing unit consisting of the ring electrode 15 and the pair of end-cap electrodes 16. The mass analyzing unit applies a main high-frequency voltage to the ring electrode 15 to form a three-dimensional quadrupole electric field in a space enclosed by the ring electrode and the pair of end-cap electrodes. A sample ionized in the ion source 12 is introduced into the space enclosed by the ring electrode and the pair of end-cap electrodes and is once held there by the formed three-dimensional quadrupole electric field. After that, when obtaining mass spectrum data, the applied main high-frequency voltage is scanned, thereby ions are discharged to and detected by the detector 17 in an ascending order of the mass. The detected ion current signal is sent to the data processing unit 20 and recorded as mass spectrum data in such a form that the mass-to-charge (m/z) ratio is shown on the horizontal axis at certain time intervals.

A single set of data is normally obtained in about several milliseconds. Samples can be introduced continuously in units of 10 minutes to one hour. Data can thus be obtained repetitively while changing conditions.

The present invention makes good use of such features of the ion trap capable of discharging ions selectively by controlling the electric field as described above.

Embodiment 1

Next, a description will be made of the flow of a calibration process in the first embodiment with reference to the accompanying drawings.

Figure 3:
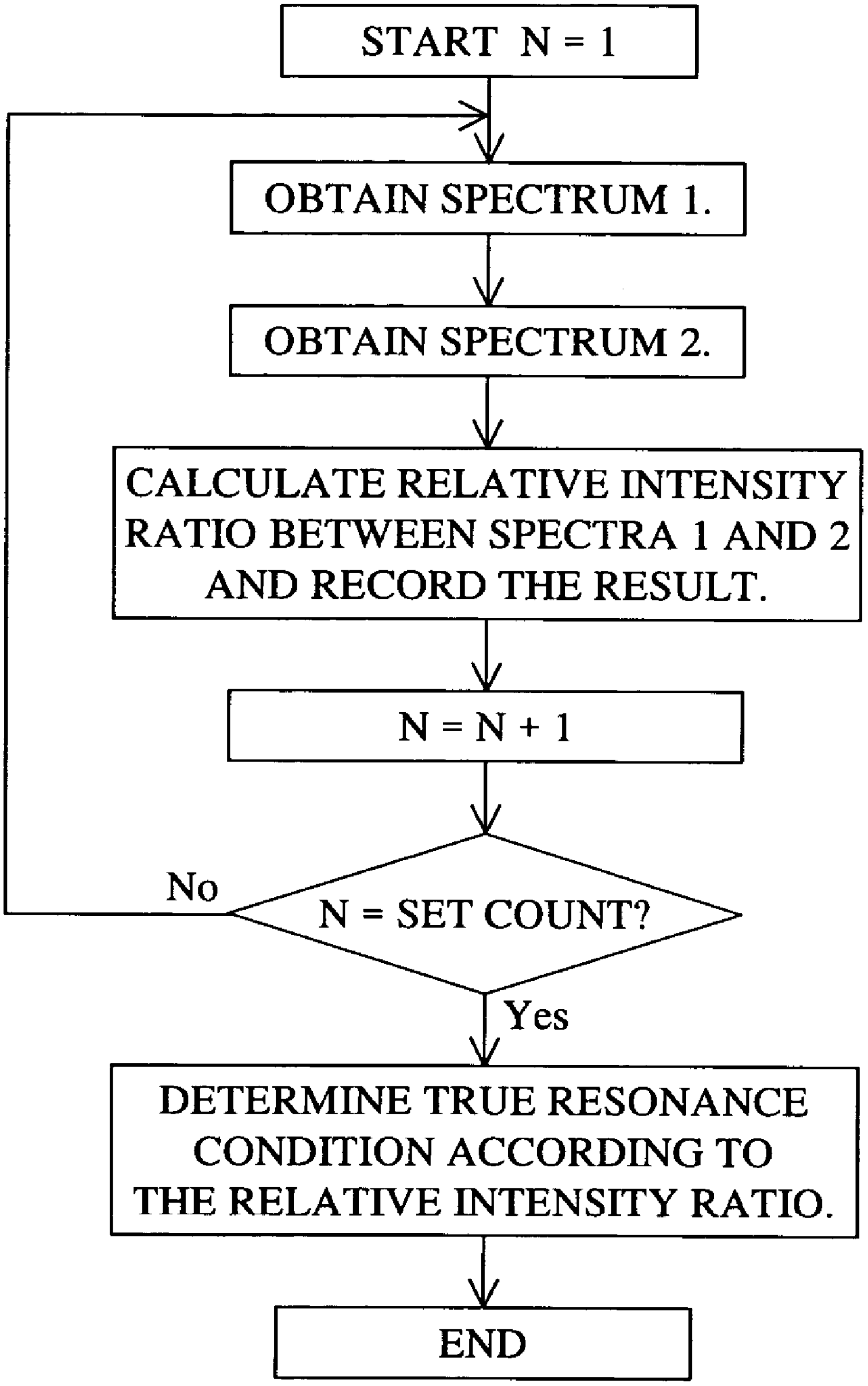
FIG. 3 is a flowchart of the first embodiment.

FIG. 3 shows a flowchart of the first embodiment.

At first, "1" is set in the algebraical symbol N in the data processing unit 20 (or control unit 18) to start the processing. At the same time, a standard sample of which the observed mass is known in advance is caused to flow into the ion source 12 at a fixed flow rate, using the sample introducing device 10, so that the sample is ionized. This ionization of the standard sample with the known observed mass is continuously performed until the end of the calibration process.

Figure 2A:
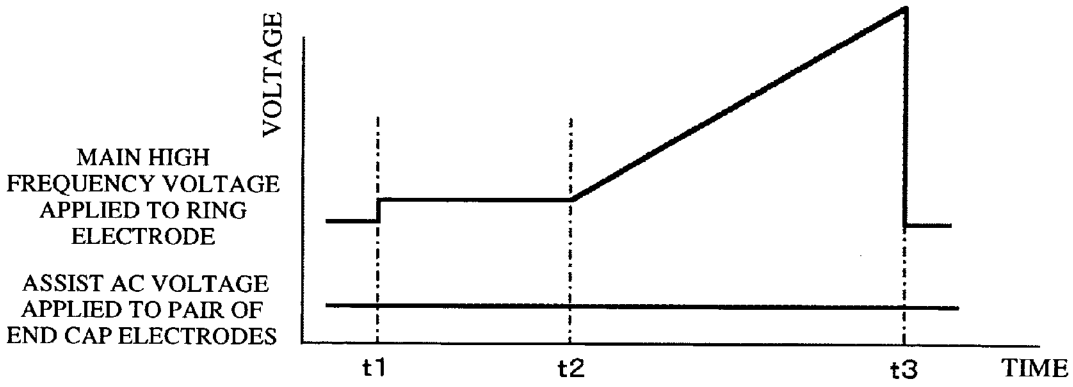
FIG. 2 is graphs for describing the operation of an ion trap in the first embodiment.

Thereafter, a spectrum 1 is obtained. FIG. 2A shows an example of the ion trap operation to obtain the spectrum 1. As shown in FIG. 2A, an auxiliary AC voltage is not applied to the end-cap electrodes in this step. Namely, the ion trap is operated using only the main high-frequency voltage to be applied to the ring electrode. The time between t1 and t2 is a period in which standard sample ions are accumulated in the ion trap. The time between t2 and t3 is a period in which ions are discharged from the ion trap and the mass spectrum is obtained. The mass spectrum obtained in this period is defined as spectrum 1. In other words, in this step, introduced ions are once confined in the ion trap, and then all the confined ions are discharged to the detector 17 to obtain the mass spectrum data.

Figure 2B:
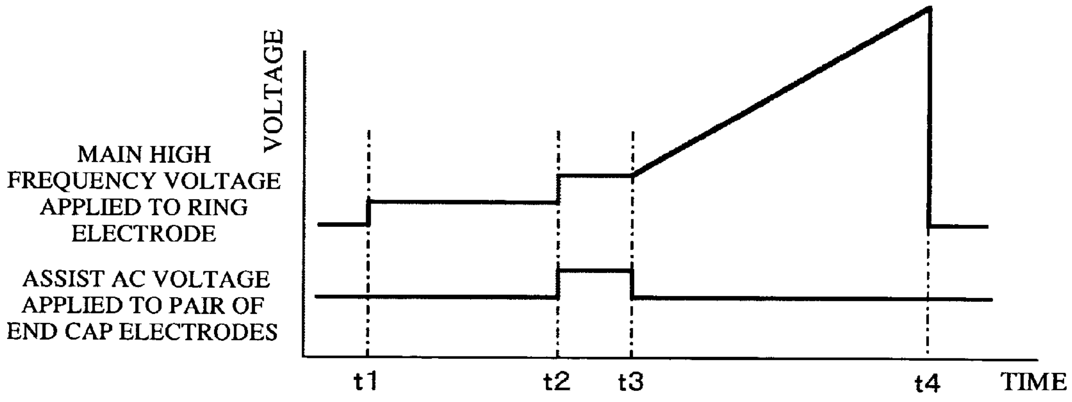

After that, a spectrum 2 is obtained. FIG. 2B shows an example of the ion trap operation to obtain the spectrum 2. The time between t1 and t2 is a period in which standard sample ions are confined in the ion trap. The time between t2 and t3 is a period in which such a voltage is applied to the ion trap that ions of a specific mass are discharged by resonance in accordance with a predetermined resonance condition. The time between t3 and t4 is a period in which the main high-frequency voltage applied to the ring electrode is swept so as to discharge the ions left over in the ion trap and in which mass spectral data is acquired by the detector 17. The mass spectrum obtained in this period is defined as spectrum 2.

Figures 6, 7:
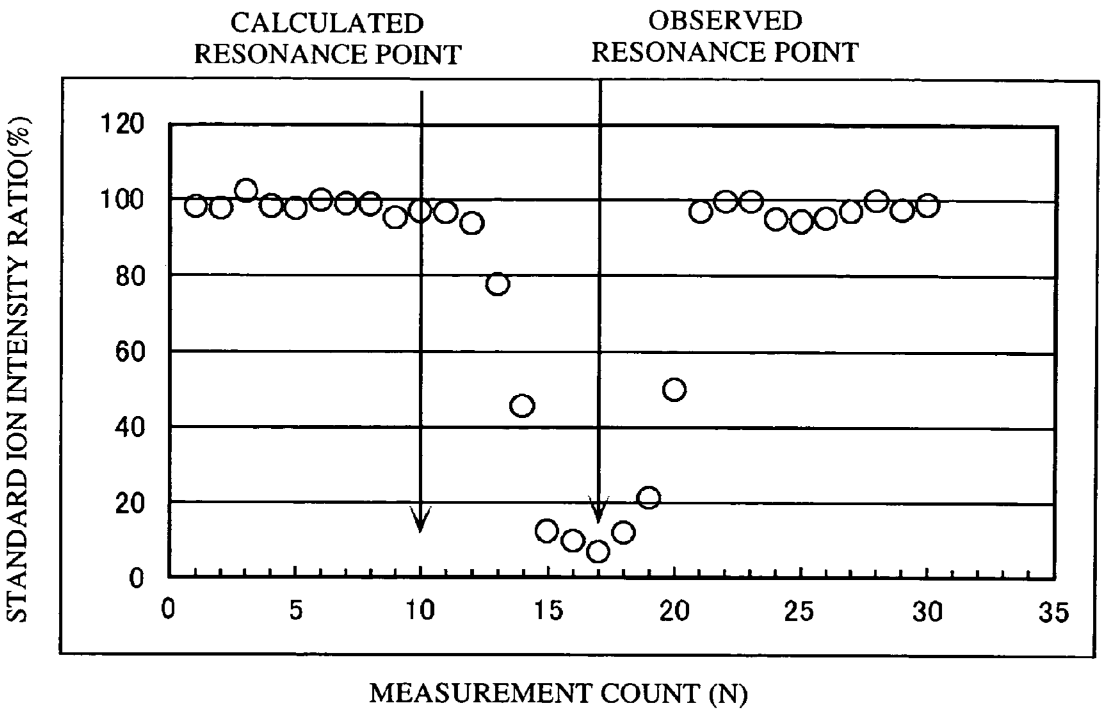
FIG. 6 is a graph for describing ion intensity data of both spectra 1 and 2.
FIG. 7 is an example of resonance condition setting data.

FIGS. 7 and 8 show examples of predetermined resonance conditions between times t2 and t3. Such set condition data is set beforehand and stored in the data processing unit 20 (or control unit 18) so that a condition corresponding to the algebraical symbol N (count) can be present when the spectrum 2 is obtained. In the examples of set conditions shown in FIG. 7, the frequencies of both the main high-frequency voltage and the auxiliary AC voltage are fixed and the voltage value of the high-frequency voltage applied to the ring electrode is changed in fixed steps. In the examples of conditions shown in FIG. 8, the frequency of the auxiliary AC voltage applied to the end-cap electrodes 16 is changed in fixed steps. Between times t2 and t3, one of those conditions is employed.

After that, the intensity ratio of the standard sample ions detected in each of the spectra 1 and 2 is calculated and the resultant data is recorded.

After that, the value in the algebraical symbol N is incremented, and the process then returns to the step for obtaining the spectrum 1. Measurements are made by repeating this series of operations while varying the resonance condition little by little according to the set condition data of FIG. 7 or FIG. 8, and the intensity ratio data is recorded.

This series of operations is repeated until the value in the algebraical symbol N reaches the number corresponding to the condition preset in the set condition data. When the predetermined count is reached, the set condition of the measurement number (N) with the lowest intensity ratio is searched from among the standard sample ion intensity ratio data that have been recorded. The set condition thus retrieved is assumed to be a true resonance condition for discharging the standard sample ions by resonance.

Figure 4:
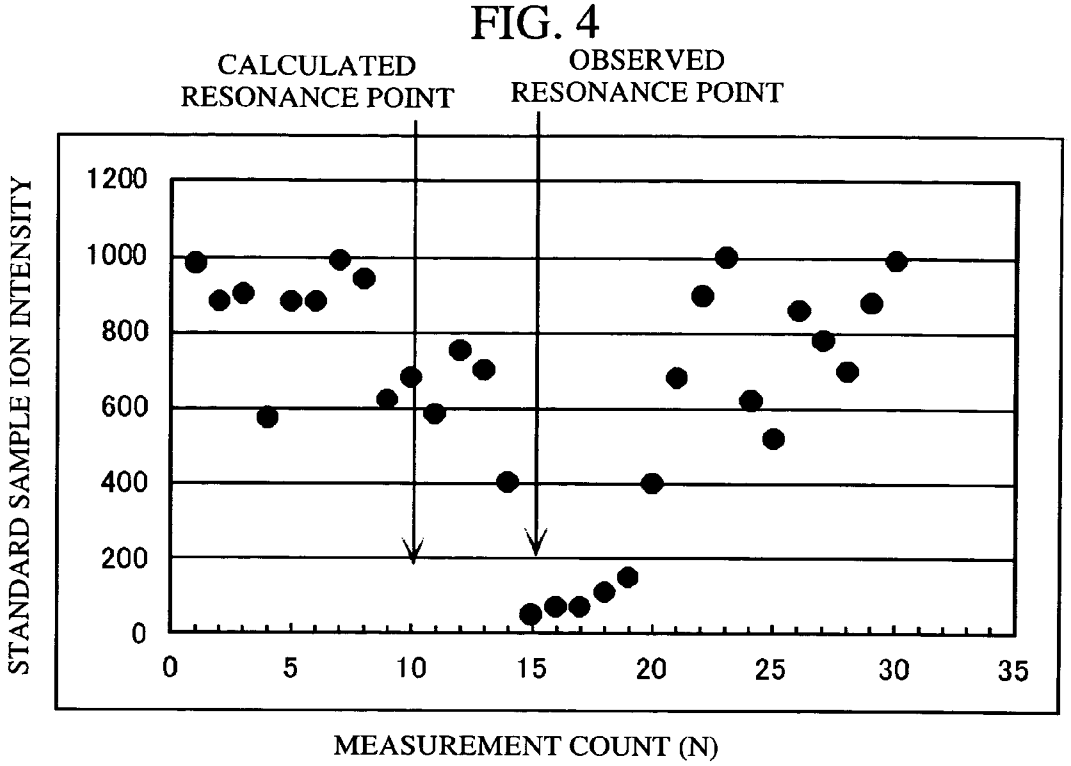
FIG. 4 is a graph for describing an example of obtained data of spectrum 2.

FIG. 4 shows an example of how to obtain data of the above spectrum 2. This data is equivalent to the measured data in calibration performed with a conventional method. The vertical axis denotes the ion intensity of the standard sample while the horizontal axis denotes the measurement count (N). In this example, the condition for applying a voltage to the ring electrode 15 is changed. Although the data is not very stable, if a point at which the lowest ion intensity is obtained is defined as a resonance condition, the point at the 10th measurement (N) is assumed as a calculated resonance point, while the lowest ion intensity in the data is obtained at the 15th measurement (N). According to the conventional method, the 10th condition is corrected to the 15th condition in the calibration.

Figure 5:
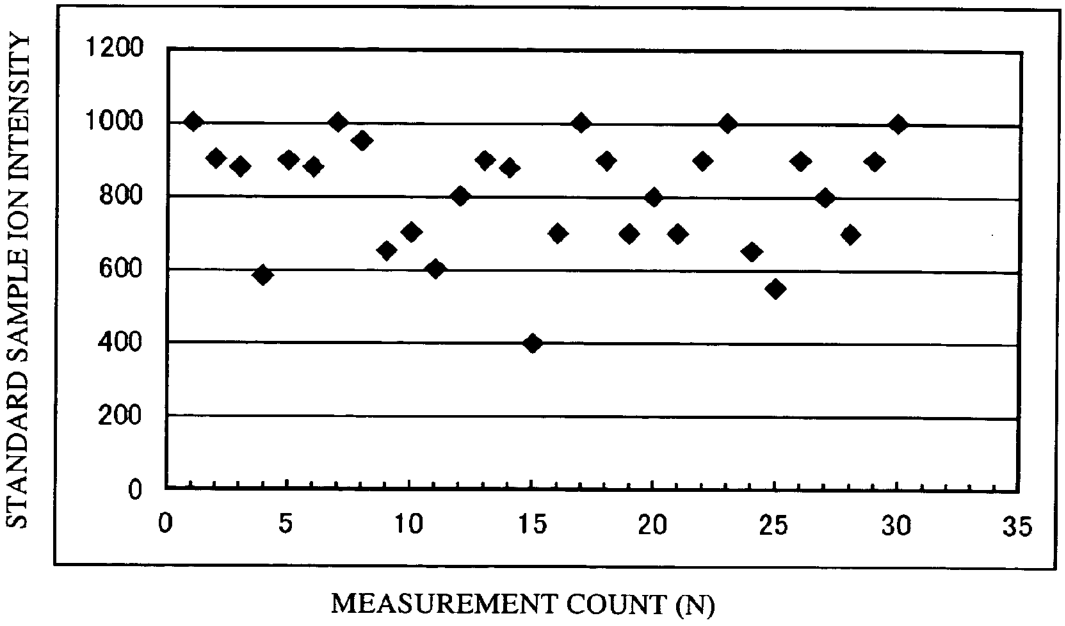
FIG. 5 is a graph for describing an example of obtained data of spectrum 1.

Next, FIG. 5 shows an example of how to obtain the data of the spectrum 1. No resonance voltage is applied to ions to obtain this data. The data denotes the total amount of ions introduced into the ion trap. Consequently, the data denotes a change in the amount of introduced ions at each measurement.

FIG. 6 shows data that is recorded by calculating an ion intensity ratio between the spectra 1 and 2 using the spectrum 1 as a reference. According to the data, it is found that the 17th data has the lowest intensity ratio. In the data of the spectrum 2 alone shown in FIG. 3, the lowest ion intensity appears in the 15th data and it is determined as a resonance condition. Actually, however, the data of the spectrum 1 in FIG. 4 shows that the amount of ions introduced from the ion source is the lowest at the 15th measurement. Consequently, the change in the total amount of the introduced ions of the spectrum 1 can be reflected in the data of the spectrum 2 by calculating the ion intensity ratio between the spectra 1 and 2. According to the obtained intensity ratio, it can be seen that the ions trapped in the ion trap are discharged most efficiently in the 17th data, so that the 17th condition is the correct resonance condition.

As a result, the resonance condition of the ion trap can be calibrated by correcting the 10th condition of the calculated resonance point to the 17th condition.

Embodiment 2

The calibration in the first embodiment enables both the voltage applied to the ion trap and its frequency to be changed to the optimum condition. And, as a result of the calibration, graphs as shown in FIGS. 4 through 6 are displayed on the display screen of the data processing unit 20. Such a calibration result is usually stored so that the calibration reliability can be confirmed later. Alternatively, however, the information used in the calibration processing as shown in FIGS. 4 and 5 may not be stored while storing only the calibration result as shown in FIG. 6, in order to prevent an increase in the data volume.

In the first embodiment, the calibration result is obtained as shown in FIG. 6. The Y axis values of that data denote the ion intensity ratio (%) and no absolute value is recorded for the ion intensity. It is sometimes desired to know the measured ion intensity value when later referring to the calibration result. In such a case, the result shown in FIG. 6 is insufficient. This second embodiment is thus intended to satisfy such demands. Concretely, while measurements are made through similar processes to those in the first embodiment, different operations are carried out during data processing so that the user is provided with much more information about the calibration result. Hereunder, such calibration operations will be described.

Figure 9:
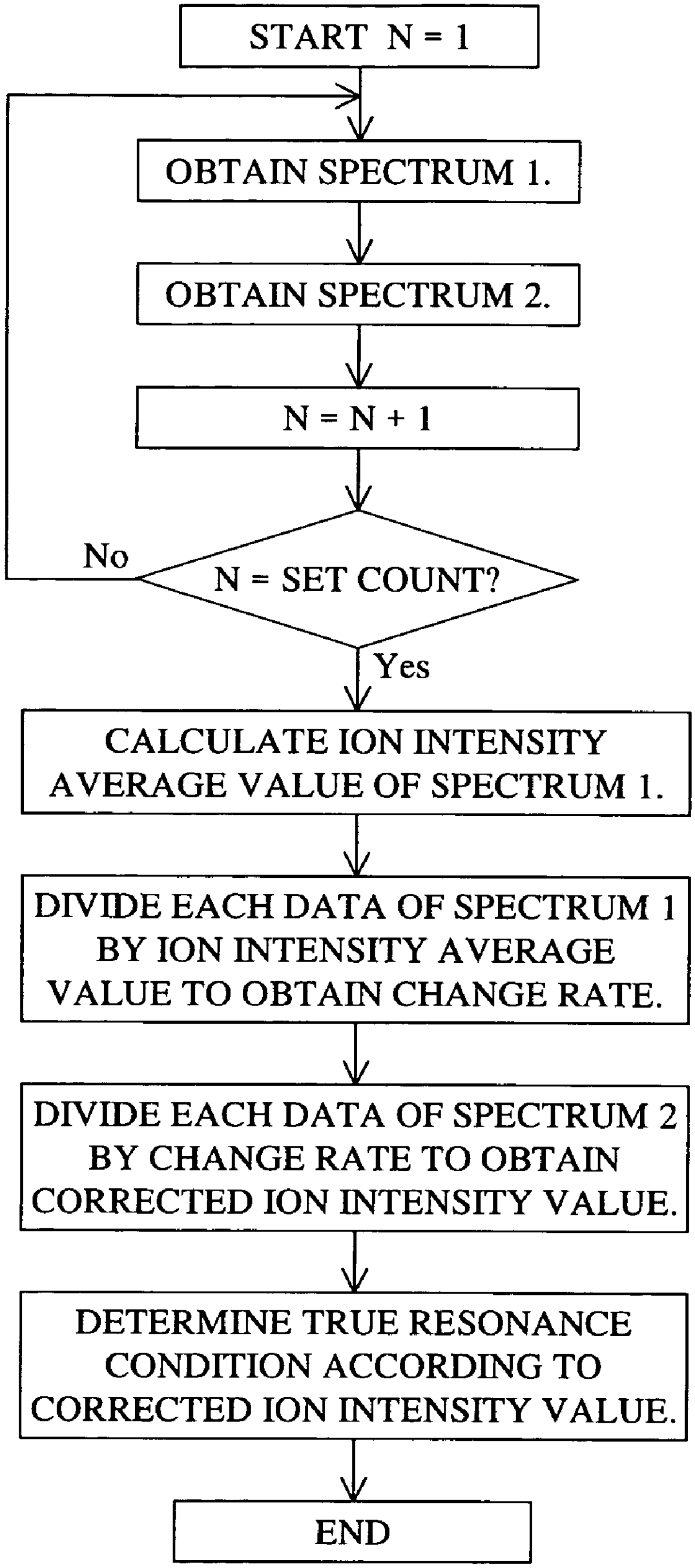
FIG. 9 is a flowchart of the second embodiment.
Figure 10A:
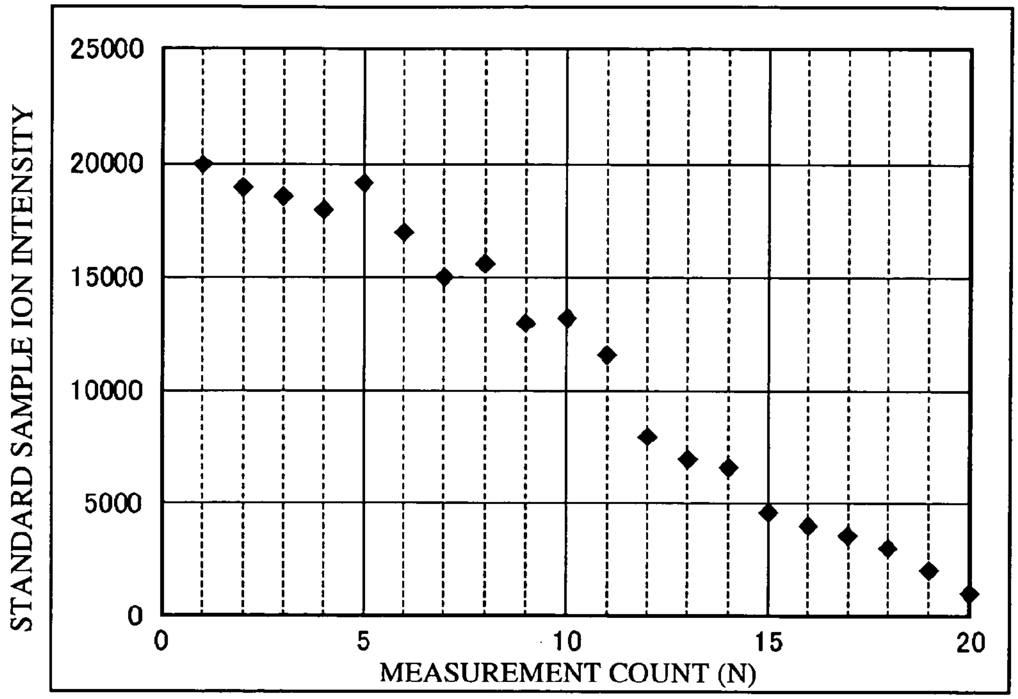
FIG. 10A is a graph for describing an example of obtained data of spectrum 1.

FIG. 9 shows a flowchart of this second embodiment. At first, the data processing unit 20 (or control unit 18) sets "1" for the algebraic symbol N to start the target processing. Then, the spectrum 1 that does not require ion discharging by resonance and the spectrum 2 that requires ion discharging by resonance are acquired alternately. After that, the spectra 1 and 2 are repetitively obtained until the predetermined measurement count (N) is reached. In this second embodiment, the definition of spectra 1 and 2 and the condition data used in each measurement are the same as those in the first embodiment. FIG. 10A shows an example of the measurement of the spectrum 1, and FIG. 10B shows an example of the measurement of the spectrum 2.

When the predetermined measurement count N is reached, an average value of all the ion intensity values of the spectrum 1 is obtained. The ion intensity of each data in the spectrum 1 is then divided by this average value to find a change rate of the ion intensity (rate of deviation from the average value). After that, each ion intensity value of the spectrum 2 is divided by this ion intensity change rate to correct the ion intensity value, thereby obtaining the final determined data. The 12th measurement condition having the lowest ion intensity value is thus set as a resonance condition here. FIG. 11B shows the result.

Figure 10B:
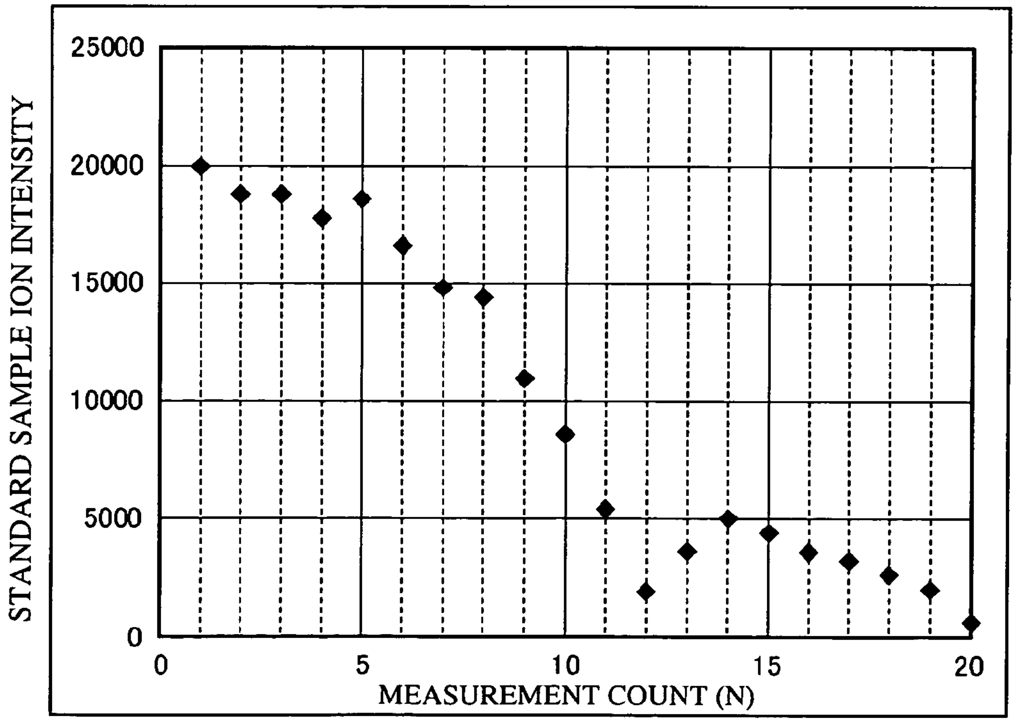
FIG. 10B is a graph for describing an example of obtained data of spectrum 2.
Figure 11A:
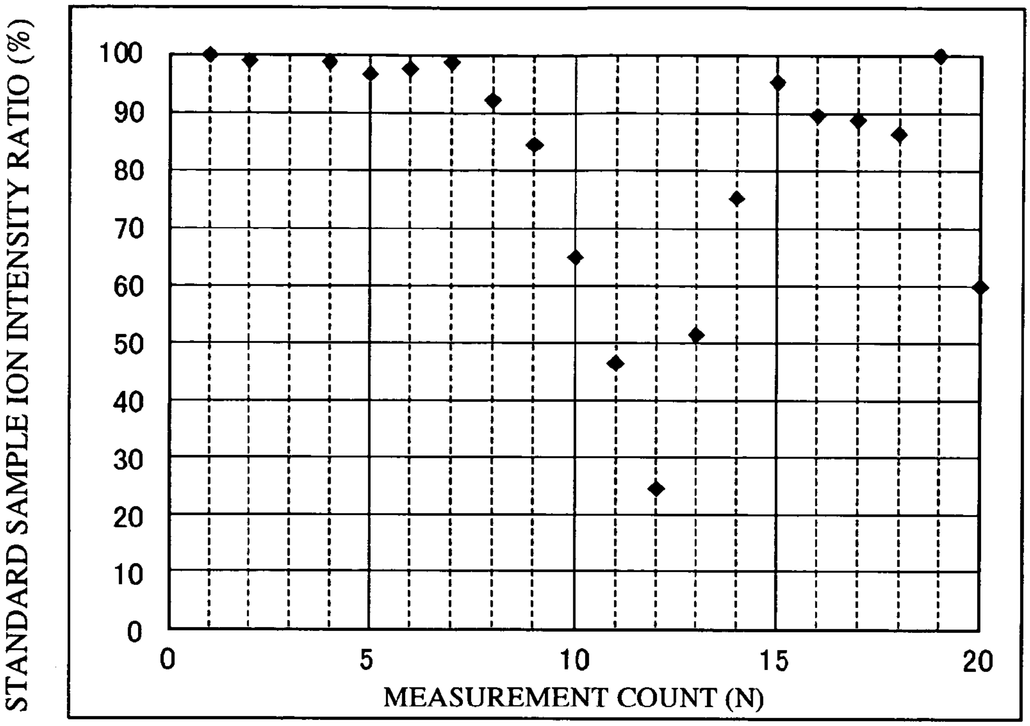
FIG. 11A is a graph for describing both intensity ratio data and ion intensity value of spectrum 1.
Figure 11B:
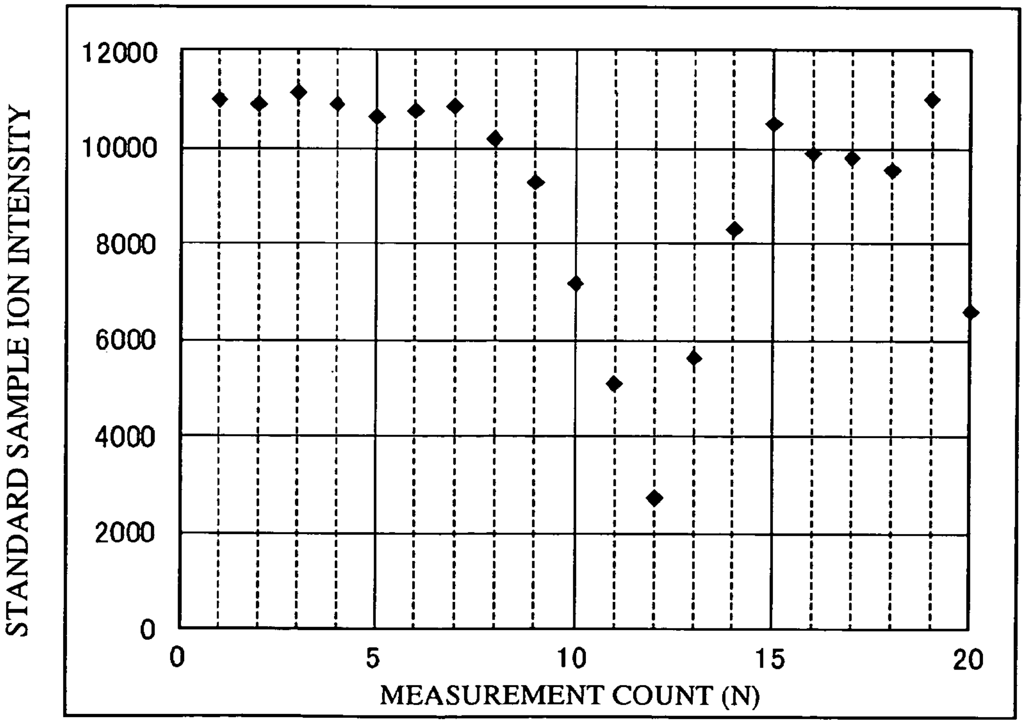
FIG. 11B is a graph for describing both intensity ratio data and ion intensity value of spectrum 2.

FIG. 11A shows an example of calculation of an ion intensity ratio based on the spectra 1 and 2 shown in FIGS. 10A and 10B in the same manner as in the first embodiment. As will be understood from a comparison between FIG. 11A and FIG. 11B, the results obtained from those spectra 1 and 2 are almost the same. In this second embodiment, however, the measurement result for calibration consists of Y-axis values that are ion intensity values multiplied by a certain factor, namely the intensity change rate. According to this second embodiment, therefore, the ion intensity value can be confirmed when later referring to the calibration result.

If standard samples are used for a mass spectroscope under a specified condition, it is usually possible to predict roughly what the ion intensity value would be. Therefore, by storing the determined data in this second embodiment, it can be determined whether or not the ion intensity during calibration was stable, as well as whether or not the ions of substantially normal intensity were observed.

Embodiment 3

Figure 12:
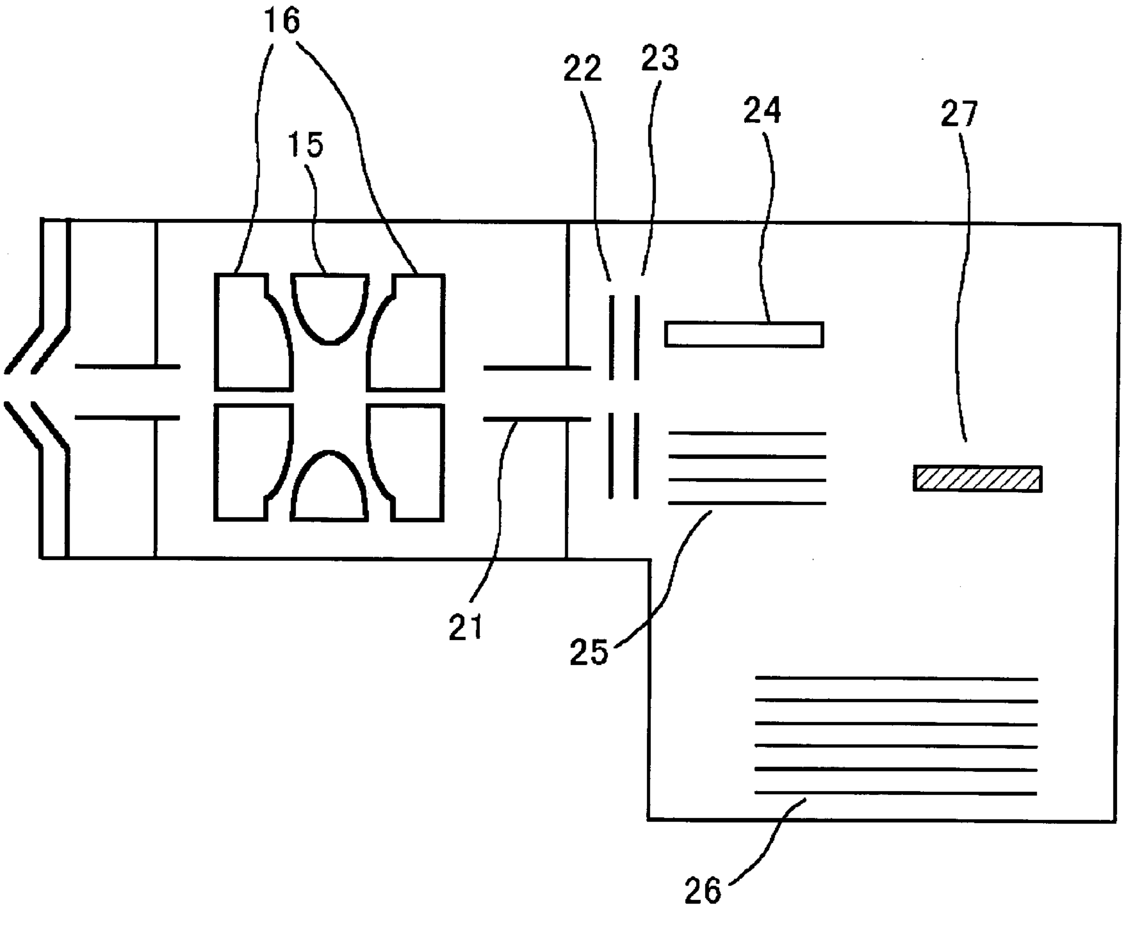
FIG. 12 is a schematic block diagram of the third embodiment.

FIG. 12 shows a block diagram of a third embodiment. The third embodiment differs from the first embodiment in that a time-of-flight type mass spectroscope is disposed in a stage just after the ion trapping device. The time-of-flight type mass spectroscope is used to obtain a mass spectrum by accurately measuring the difference in time between ions when they reach a detector in accordance with their masses after they have been accelerated at the same time.

In the configuration of the mass spectroscope in this third embodiment, ions discharged from the ion trap travel through the ion transport unit 21, then they are deflected and converged through a deflector 22 and a convergence lens 23. The ions are then accelerated in the orthogonal direction by an ion acceleration unit consisting of a pushing-out electrode 24 and an extraction electrode 25. The accelerated ions are reflected by a reflectron 26, and then reach the detector 27 where they are detected.

Mass spectral data obtained by the time-of-flight type mass spectroscope is superior to that obtained by mass separation with an ion trap in terms of mass accuracy and mass spectral resolution. Because the time-of-flight type mass spectroscope is disposed just after the ion trap as described above, the MS/MS operation can be performed using the ion trap and the generated ions can be analyzed using the time-of-flight type mass spectroscope. Although the size of the apparatus increases, an MS/MS spectrum that has high mass accuracy and high resolution can be obtained.

The calibration operation for the ion trap in this third embodiment is the same as that in the first embodiment except that the mass spectral data is obtained by the time-of-flight type mass spectroscope rather than by the ion trap. Therefore, calibration can be performed by carrying out the processes shown in the flowchart shown in FIG. 3. It is also possible to perform the processes of the second example shown in FIG. 9.

Figure 13A:
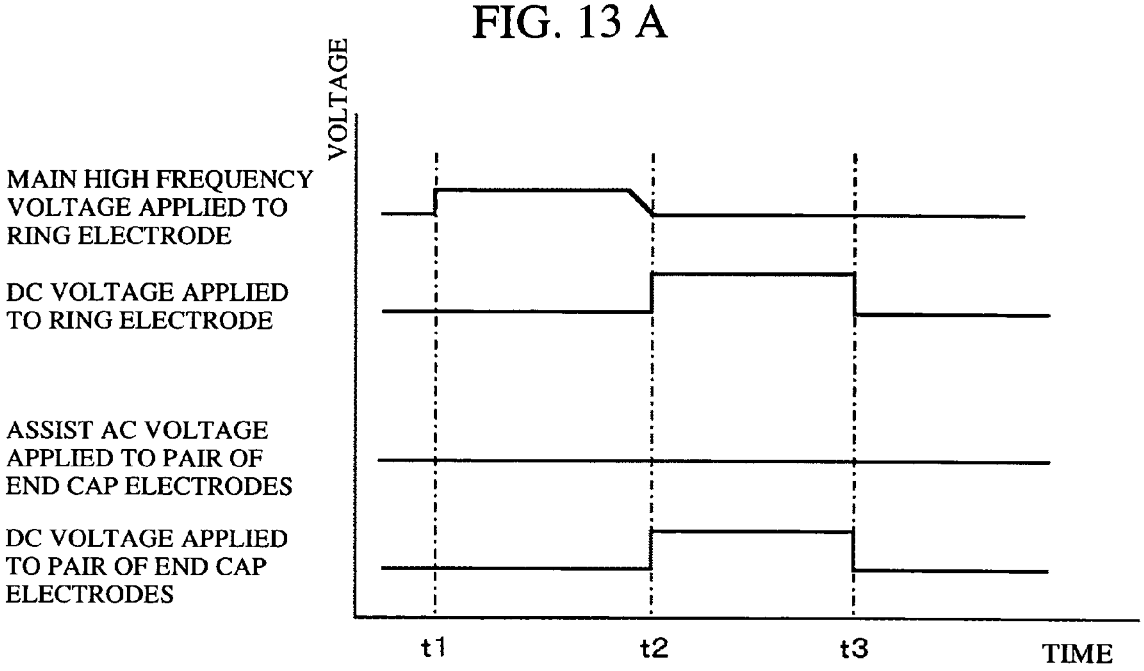
FIG. 13A is a graph for describing the operation of an ion trap in the third embodiment.
Figure 13B:
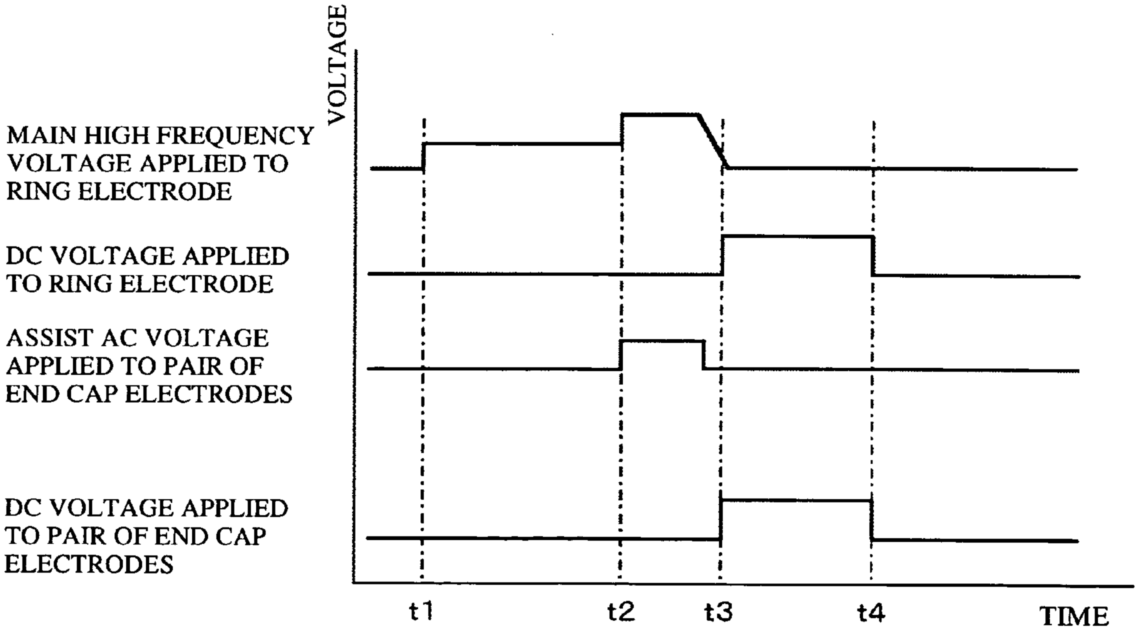
FIG. 13B is a graph for the operation of the ion trap to obtain the spectrum 2.

FIG. 13A shows the operation of the ion trap to obtain the spectrum 1, and FIG. 13B shows the operation of the ion trap to obtain the spectrum 2. This third embodiment differs from the first embodiment in the process for discharging ions after resonance. Ions are discharged between t2 and t3 in FIG. 13A and between t3 and t4 in FIG. 13B. In this third embodiment, because no mass analysis is carried out in the ion trap, trapped ions are discharged all at once upon application of a DC voltage to both the ring electrode and the end-cap electrodes.

Even in this third embodiment, the resonance condition used between t2 and t3 in FIG. 13B is such that analysis can be performed repeatedly using the preset condition data shown in FIG. 7 or 8, and the mass spectrum data obtained by the time-of-flight type mass spectroscope can be processed by the data processing unit 20, thereby obtaining the data shown in FIG. 6 or FIG. 11B. Consequently, even in an apparatus in which the ion trap and the time-of-flight type mass spectroscope are coupled, the ion trap unit can be calibrated easily.

What is claimed is:

1. A method for calibrating a mass spectroscope that includes an ion source for generating ions, an ion trap consisting of a ring electrode and a pair of end-cap electrodes used to form an ion trapping space respectively, and a detector for detecting ions output from said trapping space, said method comprising:

a first step of acquiring a first mass spectrum by trapping an ionized sample of which the mass number is known using said ion trap, discharging all of the trapped ions, and then detecting them with said detector;

a second step of acquiring a second mass spectrum by trapping a new ionized sample of which the mass number is known using said ion trap, discharging particular ions by resonance based on a predetermined set condition, and then detecting the remaining ions with said detector, wherein said first and said second steps are repeated for a predetermined number of times while said set condition is varied, and a ratio of intensity of said first mass spectrum to that of said second mass spectrum is calculated under each set condition so as to determine an ion resonance condition based on a change in said intensity ratio, and wherein a resonance condition of the ion trap is set based on the preceding steps.

2. The method according to claim 1, wherein said set condition comprises the value of a voltage or frequency applied to said ring electrode and said end-cap electrodes.

3. A method for calibrating a mass spectroscope that includes an ion source for generating ions, an ion trap consisting of a ring electrode and a pair of end-cap electrodes used to form an ion trapping space respectively, and a detector for detecting ions output from said trapping space, said method comprising:

a step of ionizing a sample of which mass is known;

a first step of acquiring a first mass spectrum by trapping an ionized sample of which the mass number is known using said ion trap, discharging all of the trapped ions, and then detecting them with said detector;

a second step of acquiring a second mass spectrum by trapping a new ionized sample of which the mass number is known using said ion trap, discharging particular ions by resonance based on a predetermined set condition, and then detecting the remaining ions with said detector;

a step of repeating said steps for acquiring said first and said second mass spectrum a predetermined number of times sequentially while said set condition is varied, and then calculating an average value of the ion intensity of said first mass spectrum;

a step of dividing the ion intensity value of said first spectrum in each set condition by said average value so as to calculate a rate of change for each of said set conditions; and a step of dividing the ion intensity value of said second spectrum in each set condition by a corresponding one of said rates of change so as to correct the ion intensity value, wherein an ion resonance condition is determined on the basis of the change in the corrected ion intensity value, and wherein a resonance condition of the ion trap is set based on the preceding steps.

4. The method according to claim 3, wherein said set condition comprises the value of a voltage or frequency applied to said ring electrode and said end-cap electrodes.

5. A mass spectroscope comprising:

an ion source for generating ions;

an ion trap consisting of a ring electrode and a pair of end-cap electrodes used to form an ion trapping space respectively;

a detector for detecting ions output from said trapping space; and a control unit for setting a voltage to be applied to said ion trap and controlling said voltage, wherein said control unit has the functions for performing the following steps:

a first step of acquiring a first mass spectrum by trapping an ionized sample of which the mass number is known using said ion trap, discharging all of the trapped ions, and then detecting them with said detector; and a second step of acquiring a second mass spectrum by trapping a new ionized sample of which the mass number is known using said ion trap, discharging particular ions by resonance based on a predetermined set condition, and then detecting the remaining ions with said detector, wherein said first and said second steps are repeated for a predetermined number of times while said set condition is varied, and a ratio of intensity of said first mass spectrum to that of said second mass spectrum is calculated under each set condition so as to determine an ion resonance condition based on a change in said intensity ratio, and wherein a resonance condition of the ion trap is set based on the preceding steps.

6. A mass spectroscope comprising:

an ion source for generating ions;

an ion trap consisting of a ring electrode and a pair of end-cap electrodes used to form an ion trapping space respectively;

a detector for detecting ions output from said trapping space; and a control unit for setting a voltage to be applied to said ion trap and controlling said voltage, wherein said control unit has the functions for performing the following steps:

a first step of acquiring a first mass spectrum by trapping an ionized sample of which the mass number is known using said ion trap, discharging all of the trapped ions, and then detecting them with said detector;

a second step of acquiring a second mass spectrum by trapping a new ionized sample of which the mass number is known using said ion trap, discharging particular ions by resonance based on a predetermined set condition, and then detecting the remaining ions with said detector;

repeating said steps for acquiring said first and said second mass spectrum a predetermined number of times sequentially while said set condition is varied, and then calculating an average value of the ion intensity of said first mass spectrum;

a step of dividing the ion intensity value of said first spectrum in each of said set conditions by said average value so as to calculate a rate of change for each set condition; and a step of dividing the ion intensity value of said second spectrum for each set condition by a corresponding one of said rates of change so as to correct the ion intensity value, wherein an ion resonance condition is determined on the basis of the change in the corrected ion intensity value, and wherein a resonance condition of the ion trap is set based on the preceding steps.

7. A mass spectroscope comprising:

an ion source for generating ions;

an ion trap consisting of a ring electrode and a pair of end-cap electrodes used to form an ion trapping space respectively;

a time-of-flight type mass spectroscope for carrying out mass analysis on the ions output from said trapping space; and a control unit for setting a voltage to be applied to said ion trap and controlling said voltage, wherein said control unit has the functions for performing the following steps:

a first step of acquiring a first mass spectrum by trapping an ionized sample of which the mass number is known using said ion trap, discharging all of the trapped ions, and then detecting them with said detector; and a second step of acquiring a second mass spectrum by trapping a new ionized sample of which the mass number is known using said ion trap, discharging particular ions by resonance based on a predetermined set condition, and then detecting the remaining ions with said detector, wherein said first and said second steps are repeated for a predetermined number of times while said set condition is varied, and a ratio of intensity of said first mass spectrum to that of said second mass spectrum is calculated under each set condition so as to determine an ion resonance condition based on a change in said intensity ratio, and wherein a resonance condition of the ion trap is set based on the preceding steps.

8. A mass spectroscope comprising:

an ion source for generating ions;

an ion trap consisting of a ring electrode and a pair of end-cap electrodes used to form an ion trapping space respectively;

a time-of-flight type mass spectroscope for carrying out mass analysis on the ions output from said trapping space; and a control unit for setting a voltage to be applied to said ion trap and controlling said voltage, wherein said control unit has the functions for performing the following steps:

a first step of acquiring a first mass spectrum by trapping an ionized sample of which the mass number is known using said ion trap, discharging all of the trapped ions, and then detecting them with said detector, a second step of acquiring a second mass spectrum by trapping a new ionized sample of which the mass number is known using said ion trap, discharging particular ions by resonance based on a predetermined set condition, and then detecting the remaining ions with said detector;

a step of repeating said steps for acquiring said first and said second mass spectrum a predetermined number of times sequentially while said set condition is varied, and then calculating an average value of the ion intensity of said first mass spectrum;

a step of dividing the ion intensity value of said first spectrum in each of said set conditions by said average value so as to calculate a rate of change for each set condition; and a step of dividing the ion intensity value of said second spectrum for each set condition by a corresponding one of said rates of change so as to correct the ion intensity value, wherein an ion resonance condition is determined on the basis of the change in the corrected ton intensity value, and wherein a resonance condition of the ion trap is set based on the preceding steps.

* * * * *